(12) United States Patent
Karecki

(10) Patent No.: US 6,258,014 B1
(45) Date of Patent: Jul. 10, 2001

(54) EXERCISE KIT AND METHOD OF USING SAME

(76) Inventor: Linda Lee Karecki, P.O. Box 1515, Solana Beach, CA (US) 92073

( * ) Notice: Subject to any disclaimer, the term of this patent is extended or adjusted under 35 U.S.C. 154(b) by 0 days.

(21) Appl. No.: 09/370,049

(22) Filed: Aug. 6, 1999

(51) Int. Cl.$^7$ .......................... A63B 21/02; A41D 13/00
(52) U.S. Cl. ............................... 482/121; 482/124; 2/23; 2/69
(58) Field of Search ................. 128/882; 2/23, 2/16, 79, 69, 227, 456; 482/121, 124; 602/26, 16

(56) References Cited

U.S. PATENT DOCUMENTS

| | | | |
|---|---|---|---|
| 4,384,369 | * | 5/1983 | Prince ........................................ 2/227 |
| 5,875,491 | * | 3/1999 | Wilkinson .................................. 2/227 |
| 5,921,945 | * | 7/1999 | Gray ........................................... 602/5 |
| 5,978,965 | * | 11/1999 | Summers ..................................... 2/69 |

* cited by examiner

Primary Examiner—Jerome W. Donnelly
(74) Attorney, Agent, or Firm—Jerry R. Potts

(57) ABSTRACT

An exercise kit includes a lightweight garment having at least a pair of elongated pockets. An elongated bent plastic member is secured within desired ones of the pockets to provide resistance when deformed and no resistance when restored resiliently to an original shape. The method of using the kit includes performing physical activities that includes movement of at least some portion of the body sufficient to cause the plastic member to deform and to provide sufficient resistance to the movement to tone the muscles of the user experiencing such resistance.

In another embodiment an exercise kit includes at least one elongated plastic member having a distal end pair of slots and a proximate end pair of slots. A pair of securing straps conformed to fit within respective ones of the slots helps secure the plastic member in a position extending longitudinally along a limb portion of a user. The plastic member is resilient and provides resistance when deformed and no resistance when restored to an original shape. The method of using the kit includes looping the straps through the slot pairs and then fastening them at the upper and lower portions of the limb of a user. The user then performs physical activities including movement of at least some portion of the limb sufficient to cause the plastic member to deform and to provide sufficient resistance to the movement to tone the muscles of the user experiencing such resistance.

28 Claims, 4 Drawing Sheets

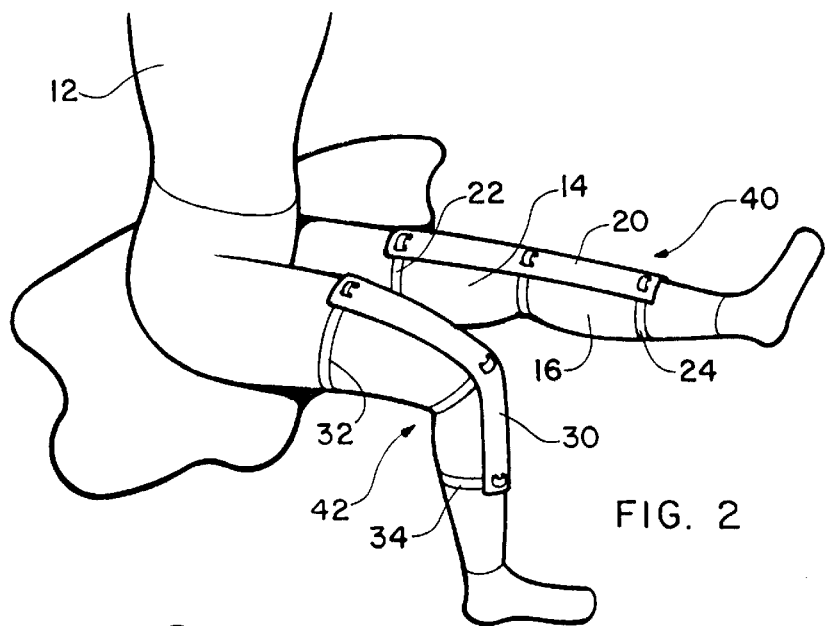
FIG. 2
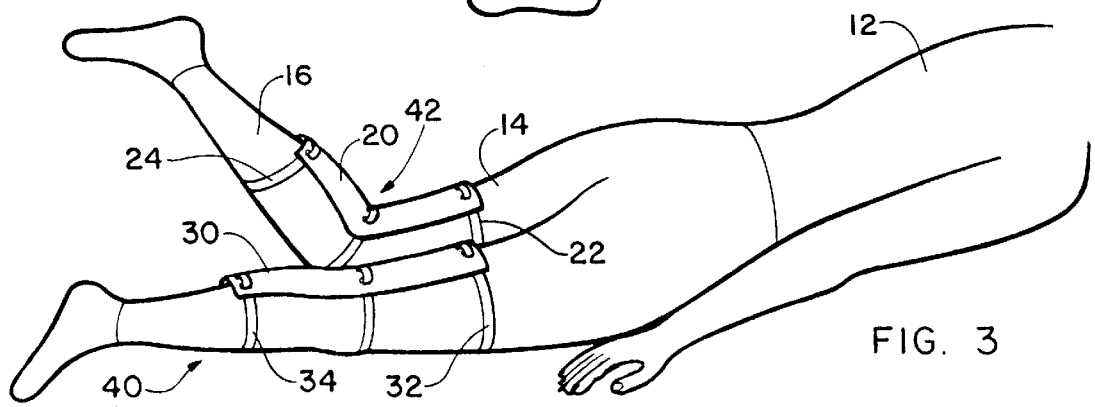
FIG. 3
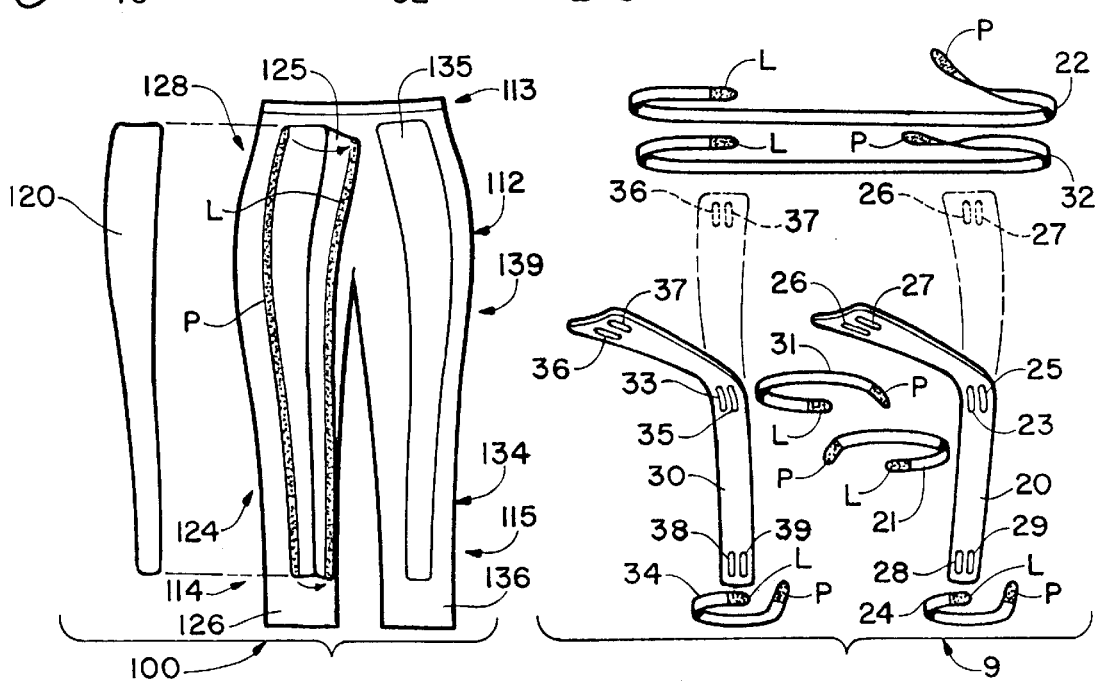
FIG. 4
FIG. 1

US 6,258,014 B1

EXERCISE KIT AND METHOD OF USING SAME

TECHNICAL FIELD

The present invention relates in general to exercise equipment as well as a method for providing muscle conditioning. The invention more particularly relates to a muscle toning kit and method which enables a user to tone his or her muscles, without tending to cause unwanted and undesired muscle strain or soreness.

BACKGROUND

Exercise equipment for conditioning and toning muscles has existed in a variety of forms. The majority of such equipment for most part has been large, bulky and expensive except for garment type items. For example, reference may be made to U.S. Pat. Nos.: 3,559,654; 3,759,510; 5,033,123; 5,109,546; 5,465,428, 5,842,859; 5,897,423; and 5,708,976.

U.S. Pat. No. 3,759,510 describes an exercise garment including a helmet, jacket, armlets, gloves, belt, shorts, thigh leggings, calf leggings and boots with these components being detachably connected together for the use of a total composite garment or for the use separately in various combinations, each component of the total garment having exterior pockets which may be filled or partially filled with a particular weight material of various densities. This exercise garment is cumbersome and should be worn on the outside, not underneath the clothes.

U.S. Pat. No. 5,033,123 relates to a garment that comprises a pair of trousers and optionally a solid upper jacket to form a combination suit. This garment is worn in such activities as lumbering and sporting where consider body bending is involved. These trousers and jacket are worn on the outside, not as an undergarment.

U.S. Pat. No. 5,109,546 relates to an exercise suit with form fitting pants and pullover top made of stretchable material having reinforcing segments with helically wound leg and arm resistance bands attached integrally to the suit.

While such garments may have been satisfactory for certain situations they generally could not be casually worn while performing normal daily activities to achieve satisfactory muscle toning benefits.

Therefore, it would be highly desirable to have a new and improved exercise garment and kit, which is comfortable to wear and which provides good muscle toning without causing unwanted and undesired muscle strain or soreness.

DISCLOSURE OF INVENTION

In one embodiment an exercise kit includes a lightweight foundation article of clothing having at least a pair of elongated pockets. An elongated bent elastomeric urethane member is secured within desired ones of the pockets and provides resistance when deformed and no resistance when restored resiliently to its original shape. The method of using the kit includes performing physical activities that includes movement of at least some portion of the body sufficient to cause the urethane member to deform and to provide sufficient resistance to the movement to tone the muscles of the user experiencing such resistance.

In another embodiment an exercise kit includes at least one elongated polyurethane memory member having a distal end pair of slots and a proximate end pair of slots. A pair of securing straps conformed to fit within respective ones of the slots helps secure the memory member in a position extending longitudinally along a limb portion of a user. The memory member is resilient and provides resistance when deformed and no resistance when restored to an original shape. The method of using the kit includes looping the straps through the slot pairs and then fastening them at the upper and lower portions of the limb of a user. The user then performs physical activities including movement of at least some portion of the limb sufficient to cause the memory member to deform and to provide sufficient resistance to the movement to tone the muscles of the user experiencing such resistance.

In still yet another embodiment of the present invention an exercise garment includes a sheet of elastomeric urethane fixed to a stretchable foundation fabric, such as Lycra or Spandex to provide sufficient resistance to body movement to help facilitate blood circulation due to the muscle resistance provided by the garment.

BRIEF DESCRIPTION OF THE DRAWINGS

The above mentioned features of the invention and the manner of attaining them will become apparent, and the invention itself will be best understood by reference to the following description of the embodiments of the invention in conjunction with the accompanying drawings wherein:

FIG. 1 is a pictorial view illustrating operative elements of an exercise kit, which is constructed in accordance with the present invention;

FIG. 2 is a pictorial view illustrating the exercise kit of FIG. 1 being utilized by a user in accordance with method of the present invention;

FIG. 3 is a pictorial view illustrating the exercise kit of FIG. 1 being utilized by a user in accordance with method of the present invention;

FIG. 4 is a pictorial view illustrating operative element of another exercise kit, which is constructed in accordance with the present invention;

BEST MODE FOR CARRYING OUT THE INVENTION

Figures 5, 6:
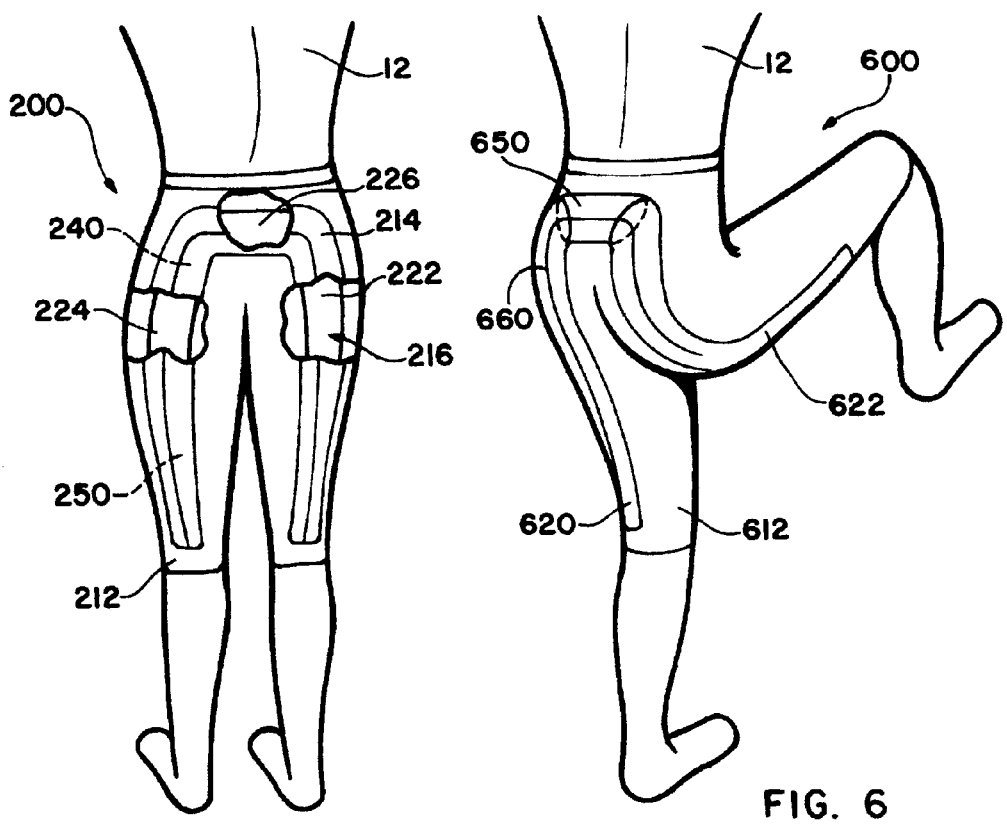
FIG. 5 is a pictorial view illustrating operative elements of yet another exercise kit, which is constructed in accordance with the present invention.
FIG. 6 is a pictorial view illustrating operative elements of an exercise garment which is constructed in accordance with the present invention.

Referring now to the drawings and more particularly to FIG. 1 there is shown an exercise or muscle toning kit 9 which is constructed in accordance with the present invention. The kit 9 is used according to the method of the present invention to facilitate muscle toning in a fast and convenient manner allowing a user 12 to accomplish muscle toning exercises while carrying on normal daily activities.

Considering now the exercise kit 9 in greater detail with reference to FIG. 1, the muscle toning kit 9 generally comprises a pair of elongated resilient memory members 20 and 30 respectively, a set of upper extremity attachment straps 22 and 32 respectively, and a set of lower extremity attachment straps 24 and 34 respectively. The memory members 20 and 30 each contain pairs of upper and lower attachment strap slots, such as the slots 26,27 and 28,29 associated with member 20 and the slots 36,37 and 38.39 associated with the member 30. The slots 26,27 and 36,37 are dimensioned to receive therein straps 22 and 32 respectively, while the slots 28,29 and 36,37 are dimensioned to receive therein straps 24 and 34 respectively. In this regard, the straps 22 and 24, as will be explained hereinafter in greater detail, enable the member 20 to be removably attached to an extremity of the user 12 so that the member 20 extends between the upper and lower portions of the extremity of the user 12, such as between an upper leg portion 14 and a lower leg portion 16 of the user.

In order to secure the respective members 20 and 30 to the extremities of the user 12, each of the straps 22, 24 and 32, 34 include at their respective distal and proximate ends a set of loops, indicated generally at L, and a set of piles, indicated generally at P. The loops L and piles P are configured to latch engagingly together with one another to facilitate securing the ends of the straps together and thus, securing the members 20 and 30 to the extremities of the user 12.

From the foregoing, those skilled in the art will understand that the muscle toning kit 10 can be utilized with any two extremities of the user simultaneously or alternatively with a single extremity of the user depending upon the desires of the user 12.

Considering now the method of using the muscle toning kit 10 with respect to FIGS. 1 and 2, the user 12 retrieves one of the members, such as the member 20 and then using the longer of the attachment straps 22 loops the strap through the slots 26,27 to attach the strap 22 to the upper portion of the member 20. Next the user loops the shorter of the straps 24 through the slots 28,29 to attach the strap 24 to the lower portion of the member 20.

With both of the straps 22 and 24 attached to the member 20, the user places the member 20 in a desired exercising position so that the member 20 extends between an upper portion of a desired extremity, such as the upper leg portion 14, and a lower portion of the desired extremity, such as the lower leg portion 16. In this regard, FIG. 2 illustrates the placement on a front portion of the leg extremity of the user 12, while FIG. 3 illustrates the placement on a rear portion of the leg extremity of the user 12

The user next loops the longer strap 22 around the upper portion 14 of the desired extremity and attaches the end portions of the strap 22 together, using the piles P and the loops L, so that the upper portion of the member 20 is firmly attached to the upper portion of the desired extremity. The user 12 then loops the shorter strap 24 around the lower portion 16 of the desired extremity and attaches the end portions of the strap 24 together, using the piles P and loops L, so that the lower portion of the member 20 is firmly attached to the lower portion of the desired extremity.

Once the member 20 has been attached between the upper and lower portions of the desired extremity, the user is then able to move the extremity between a straight natural position, such as a naturally compressed position 40 and a straight position, such as a straight position 42 as best seen in FIG. 2.

Considering now the use of the exercise kit 9 in greater detail with reference to FIG. 3, when the user lowers his or her lower extremity downwardly and away from the gluteus maximus muscle, the member 20 assumes a stressed position causing the member 20 to resist the downward movement of the user 12. The further the user 12 moves his or her lower extremity away from the gluteus maximus muscle of the user, the greater the resistance of the member 20. In this regard, when the user 12 reaches a desired amount of resistance, the user 12 then raises his or her lower leg extremity back to the starting position with the member 20 in the compressed position. The process of lowering and raising the lower extremity of the user 12 is then repeated any desired number of times, such as 10 to 100 times to tone the muscles in the desired extremity of the user 12.

If desired, the user 12 can also attach the member 30 to the opposite extremity of the user, in the substantially the same manner as described relative to the member 20 using the straps 32 and 34 in cooperation with slots 36, 37 and 38,39 respectively. The exercise routine can then be alternated by first lowering the lower portion of one extremity and returning the lower portion of that extremity to the starting position, and then lowering the lower portion of the opposite extremity downwardly and then back to the other starting position. In this manner, the user 12 is able to utilize the muscle toning kit 9 to tone the muscles of desired ones of the extremities.

Considering now the exercise kit 9 in still greater detail, the exercise kit 9 further includes a pair of intermediate straps 21 and 31 respectively for helping to secure the members 20 and 30 respectively to the extremities of a user. The plastic members 20 and 30 each contains a pair of intermediate attachment strap slots, such as the slots 23,25 and 33,35 associated with members 20 and 30 respectively. The slots 23, 25 and 33,35 are dimensioned to receive therein straps 21 and 31 respectively.

As the memory members 20 and 30 are substantially similar, only memory member 20 will be described hereinafter in greater detail. Considering now the memory member 20 in greater detail with reference to FIGS. 1–3, the memory member 20 is a cast member that is composed of a stiff plastic like elastomeric urethane material which is resilient and which exhibits a resistant compressive force when deformed from its normally U shaped configuration to a substantially straight configuration. The memory member 20 is generally smooth throughout its overall length having a wider top portion and a narrow bottom portion. In this regard, the memory member 20 is tapered from its upper end to its lower end in order to provide a greater resistive force against the upper leg muscles as opposed to the lower leg muscles. In this manner the muscle groups between the upper and lower leg of the user 12 can be easily toned with the exercise kit 9.

While in the preferred embodiment of the muscle toning kit 9 the memory members 20 and 30 were described as being elongated and having a substantially U shaped configuration along their longitudinal axes, it is contemplated that for other exercise routines, that such memory members may have other desired configurations such as an L-shaped memory member or a V-shaped memory member to exercise and tone muscles in other portions of the extremities of the user 12. From the foregoing, it should be understood by those skilled in the art that memory members of custom shapes, sizes, properties and colors and configurations, including a straight line configuration, may be utilized to exercise different ones of the muscles in the same extremity of the user 12. Thus, for example, as best seen in FIG. 3, a straight memory member 20 can be utilized on one extremity and an L-shaped memory plastic member 50 can be utilized on an opposite extremity of the user. In this manner, the user 12 is able to tone different ones of the muscle groups in the desired extremity of the user.

Figures 7, 8:
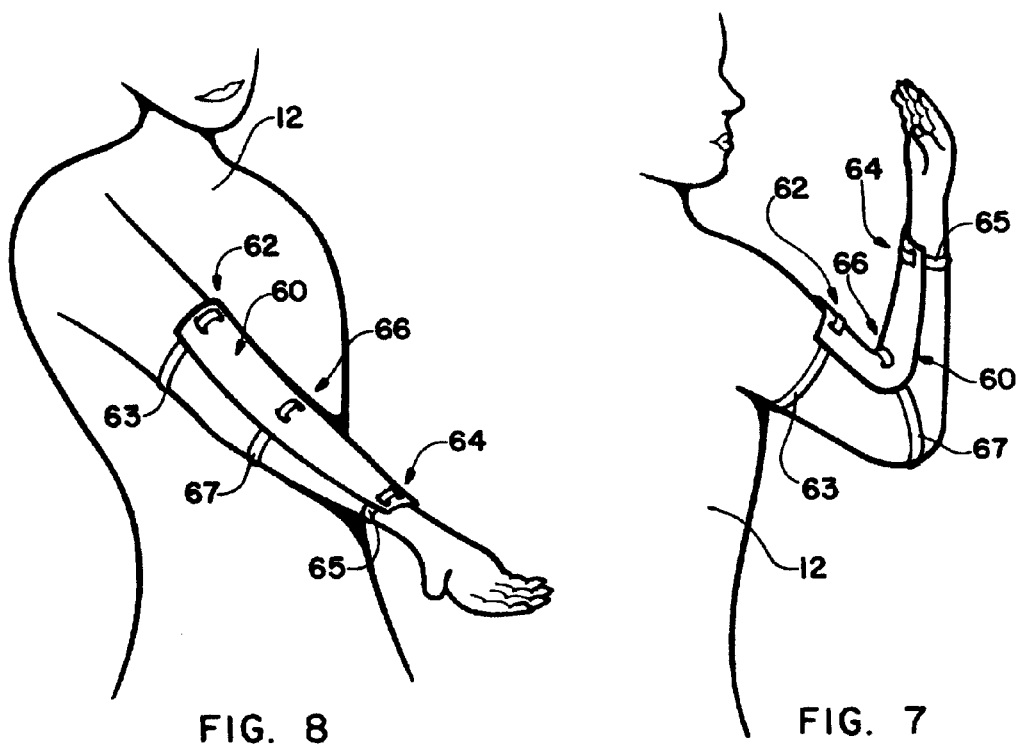
FIG. 7 is a pictorial view illustrating operative elements of still yet another exercise kit, which is constructed in accordance with the present invention.
FIG. 8 is a pictorial view illustrating the exercise kit of FIG. 7 being utilized by a user in accordance with the method of the present invention.

Also in the preferred embodiment of the present invention, the memory members 20 and 30 were described as having a sufficient length for extending along the longitudinal axis of the leg of the user 12, it is contemplated that short memory members such as a memory member 60 as illustrated in FIGS. 7 and 8 can be utilized for exercising the arm muscles of a user. In this regard, the memory member has upper, lower and intermediate slots indicated generally at 62, 64, and 66 respectively and a similar set of upper, lower, and intermediate straps 63, 65, and 67 respectively for securing the memory member 60 to the arm of a user 12. The memory member 60 in one configuration is in compression when in an L shape and in relaxation when in a straight shape. In another configuration the memory member is in compression when in a straight shape and in a relaxed state when in a straight shape. In this manner, different muscle groups of the arm of the user can be exercised and toned depending upon the needs of the user.

Referring now to the drawings and more particularly to FIG. 4 thereof, another muscle toning kit 100 is shown which is constructed in accordance with the present invention. The muscle toning kit 100 is constructed so the user 12 can passively, at his or her convenience, tone the gluteus maximus muscle groups of the user 12.

Considering now the muscle toning kit 100 in greater detail with reference to FIG. 4, the muscle toning kit 100 generally comprises an elongated memory member 120 and an exercise garment 112 in the form of trousers or pants. The exercise garment 112 includes a pair of elongated pockets 124 and 134 disposed on a left leg portion 126 and a right leg portion 136 of the garment 112 respectively. The pockets 124 and 134 are configured to receive, in a tight snug fit the memory member 120. The pockets 124 and 134 extent from about a belt line position of the garment indicated generally at 113, downwardly to about an ankle height position of the garment indicated generally at 114 and 115 on the respective ones of the left leg portion 126 and the right leg portion 136 of the garment 112.

In order to removably secure the memory member 120 in either one of the pockets 124 and 134, each pocket includes a sealable flap, such as a flap 125 associated with pocket 124 and a flap 135 associated with pocket 134. The flaps 125 and 135 are moveable between an open position, such as an open position indicated generally at 128 relative to flap 125, and a closed position, such as a closed position indicated generally at 139 relative to flap 135.

Considering now the process for using the muscle toning kit 100 in greater detail with reference to FIG. 5, the user 12 retrieves the memory member 120 and aligns the member 120 in its associated pocket 124. Once the member 120 is properly positioned in the pocket 124, the user 12 closes the flap 125 securing or sealing the member 120 within the pocket 124.

The user then repeats this process by retrieving the memory member 130 and inserting the member 130 in its associated pocket 134. Again, once the member 130 is fully inserted in the pocket 134, the user 12 closes the flap 135 securing or sealing the member 130 within the pocket 134.

With the member 120 mounted within the garment 112, the user pulls the garment 112 onto his or her leg extremities in the conventional manner pulling the garment into a normal wearing position. The user 12 then secures the garment to his or her waist.

The user 12 is now able to tone the gluteus maximus muscles by raising the upper portion of leg extremity towards the chest of the user as illustrated in FIG. 6 for example. As the user raises his or her leg in the manner the memory member is flexed from its normally biased position into a state of compression causing the user to experience resistance the closer the upper extremity is raised toward the chest of the user. When the user experiences a sufficient resistant force, the user lowers his leg back to the starting position. This process is repeated a desired number of times using the same leg or in the alternative, alternating between different ones of the legs of the user 12 by moving the plastic member 120 to the right leg pocket 134.

While in the preferred embodiment the kit 100 is described as having a single memory member 120, it is contemplated that two memory members can be provided so that a user can exercise both of his or her legs in an alternating manner without the need for moving the memory member 120 from one pocket, such as the pocket 124 to the other pocket, such as the pocket 134.

Considering now the memory member 120 in greater detail with reference to FIG. 4, the memory member 120 is composed of a stiff elastomeric polyurethane material which is resilient and which exhibits a resistant compressive force when deformed from its normally straight configuration to a U or V shaped configuration. The memory member 120 is generally smooth throughout its overall length having a wider top portion 140 and a narrow bottom portion 150. In this regard, the plastic member is tapered from its upper end to its lower end in order to provide a greater resistive force against the upper leg muscles as opposed to the lower leg muscles. In this manner the gluteus maximus muscle of the user 12 can be easily toned with the exercise kit 100.

Considering now the pant garment 112 in greater detail with reference to FIG. 4, the pant garment 112 includes an elongated strip of piles P that extends along the periphery of the longitudinal dimension of the pocket 124 and an elongated strip of loops L that extends along the periphery of the longitudinal dimension of the flap 125. The loops and piles are configured to engage lockingly together in order to seal the plastic member 120 within the pocket 124. A similar set of piles and loops (not shown) are disposed on the pocket periphery and flap periphery of pocket 134 and flap 135 respectively in order to permit the plastic member 120 to be sealed within pocket 134.

Referring now to the drawings and more particularly to FIG. 5 there is illustrated another muscle toning kit 200, which is constructed in accordance with the present invention. The muscle toning kit 200 is utilized by the user 12 to tone the gluteus maximus muscle of the user while the user is engaged in normal daily activities.

Considering now the muscle toning kit 200 in greater detail with reference to FIG. 5, the muscle toning kit 200 generally comprises a lightweight garment 212 having sewn thereon a U-shaped pocket 214. A U-shaped memory member 216 is sewn into the pocket 214 and thus, is permanently sealed therein.

In order to use the muscle toning kit 200, the user attires himself or herself with the garment 212. Next the user 12, in one or more repetitive sets, beginning at a starting position as illustrated in FIG. 5 raises the upper portion of his or her leg toward his or her chest to a fully raised position as illustrated in FIG. 6. In so moving the upper leg, the memory plastic member 216 is compressed into a general V or L shape depending on the height raised causing the gluteus maximus muscle associated with the raised leg to be toned to greater and lesser degrees. This process is repeated for the other leg causing the other gluteus maximus muscle to be toned in a similar manner.

Considering now the plastic member 216 in greater detail, the member 216 is generally U-shaped having a right leg portion 222, a left leg portion 224 and an intermediate portion 226 that is integrally connected between the right leg portion 222 at one terminal end and the left leg portion 224 at the other terminal end. As best seen in FIG. 6 the legs portions 222 and 224 in their natural uncompressed state bow away from the intermediate portion 226 forming a general L or U shape with the intermediate member 226. In this regard, when a user is standing with both of his or her feet planted on the ground as illustrated in FIG. 5, the plastic member 216 is forced into compression exerting a compressive force against both legs and buttocks of the user 12. When the user raises one of his or her legs upwardly brings the knee towards the chest, the plastic member 216 returns to its naturally resting position. The user then returns the leg to the floor, planting his or her foot on the ground to again place the plastic member 216 in tension.

As the right and left leg portions of the plastic member 216 are substantially similar, only the left leg portion will be described in greater detail. Considering now the left leg portion 224 in greater detail with reference to FIG. 5, the left leg portion 224 is smooth throughout its entire length having a wider top portion 240 and a narrow bottom portion 250. In this regard, the plastic member is tapered from its upper end to its lower end in order to provide a greater resistive force against the upper leg muscles as opposed to the lower leg muscles. In this manner the gluteus maximus muscle of the user 12 can be easily toned with the exercise kit 200.

Referring now to FIG. 6, there is illustrated an exercise garment 600 that is constructed in accordance with the present invention. The exercise garment 600 is shown as a pair or shorts or pants that can be worn throughout the day by the user 12. In this regard, the pants can be made of Lycra, Spandex or any other suitable fabric that stretches allowing free movement of the body of the user, while simultaneously allowing the skin of the user to breath.

Considering now the exercise garment 600 in greater detail with reference to FIG. 6, the exercise garment 600 generally includes a foundation article of clothing 612 that can be configured in any desired shape. In the preferred embodiment the foundation article of clothing 612 is illustrated in the form of a pair of shorts. Those skilled in the art however, will understand that the foundation article can take any foundation form normally worn by a user. Thus for example, the foundation article can be in the form of panty hose, a pull on suit, such as a wet suit utilized in scuba diving, a swimming suit and the like, a chin strap, a pair of gloves, a knee brace, an elbow brace, an ankle brace, or a mere support garment that helps stimulate blood circulation in the aged. There is therefore no intention of limiting the scope of the present invention to any specific foundation garment form.

In order to give the exercise garment 600 the ability to provide dynamic tension and compression to tone the buttocks and leg muscle groups of the user 12, a plurality of semi-stiff resilient memory members 620–622, in the form of sheets of an elastomeric urethane compound, are sewn onto the foundation article 612. The memory members 620–622 are shaped to conform to that area of the body that they will overlay. Thus, for example, in FIG. 6, the memory units 620–622 are shown overlaying the buttocks and rear legs or thighs of the user 12.

Although in the preferred embodiment of the present invention the memory units 620–622 are illustrated overlaying the buttocks and rear legs or thighs of the user 12, it should be understood by those skilled in the art that the foundation garment and the memory units can be shaped to conform to any area of the body of the user. Thus for example, the garment can be in the form of panty hose and the memory units can be in the form of narrow strips sewn along a seam portion of the panty hose to help facilitate the exercising of the lower and upper leg muscle groups of the user 12. As another example, the garment can be in the form of a body suit having a pair of spaced apart memory members, where each member extends from the chest to the upper thighs of the user to facilitate various exercise routines to exercise various muscle groups of the user. There is no intention therefore of limiting the memory units to the specific shape illustrated in FIG. 6 as many different shapes are contemplated.

Considering now the memory units 620–622 in greater detail with reference to FIG. 6, the memory units 620–622 are individual resilient memory members that cooperate with one another and that remember their initial shape and form and when distorted from their initial shape and form by normal extensions or stretching through body movement of the user, the memory units 620–622 can exert dynamic tension and or compression forces against such movement so when the distorting force is removed, they return resiliently to their original shape and form. In this manner, the memory units 620–622 can be configured in various forms to exercise various muscles of the user. For example, as shown in FIG. 6, the memory units 620–622 are shaped to tone the buttock and upper rear thigh muscles of the user 12. It will be understood, since the memory units 620–622, can be shaped to any desired form, the memory units can be shaped and fixed to a desired foundation garment to exercise each muscle group of the entire body including face, jaw, neck, back and stomach muscles for example.

Considering now the memory units 620 and 622 in greater detail with reference to FIG. 6, the memory units 620 and 622 are each substantially straight members having concave shapes to conform to the buttocks and rear thighs of the user 12. The ends of each of the members 620 and 622 are rounded and smooth to provide comfortable engagement with the body of the user 12. The distal or top portions of the memory members 620 and 622 are larger than their corresponding proximate or bottom portions since the larger distal ends are shaped to conform to the buttock muscles while the lower proximate ends are shaped to conform to the smaller thigh muscles of the user 12.

As best seen in FIG. 6, a smaller interconnecting unit 650 is stitched to the foundation garment 612 between the distal ends of the memory units 620 and 622. The interconnecting unit 650 is shaped to conform to the lower back of the user 12 and due to the smaller size the interconnecting member cooperates with memory units 620 and 622 to cause tension and compression actions with the body movements of the user 12.

Each of the units 620, 630 and 650 are stitched to the garment 612 with a stitching material shown generally at 660. The stitching material 660 is composed of the same material as units 620, 630 and 650. That is the stitching material 660 as well as the memory units 620, 630 and 650 are composed of a urethane material ranging from a stiff hard plastic form to a semi-stiff soft rubber form.

From the foregoing, it should be understood by those skilled in the art that the memory members 620 and 630 can be formed as large unitary pieces or by stitching a single thread, such as the thread 660 into any desired shape to facilitate the exercising of single muscle groups or combinations of different muscle groups including face muscle groups. Thus for example, the thread, such as the thread 660 could be sewn together to form a long narrow seam in a pair of hose. Moreover, a plurality of strands of thread can be sewn in a side by side fashion to form for example a chinstrap. Still yet, the memory members can be fabricated in combination with a stretchable fabric, such as Lycra or spandex, to form a tight fitting supporting foundation garment that helps support the muscles of a user while simultaneously encouraging good blood flow or circulation due the resistive nature of the combination of sheet urethane intermixed with the stretchable fabric.

Figure 9:
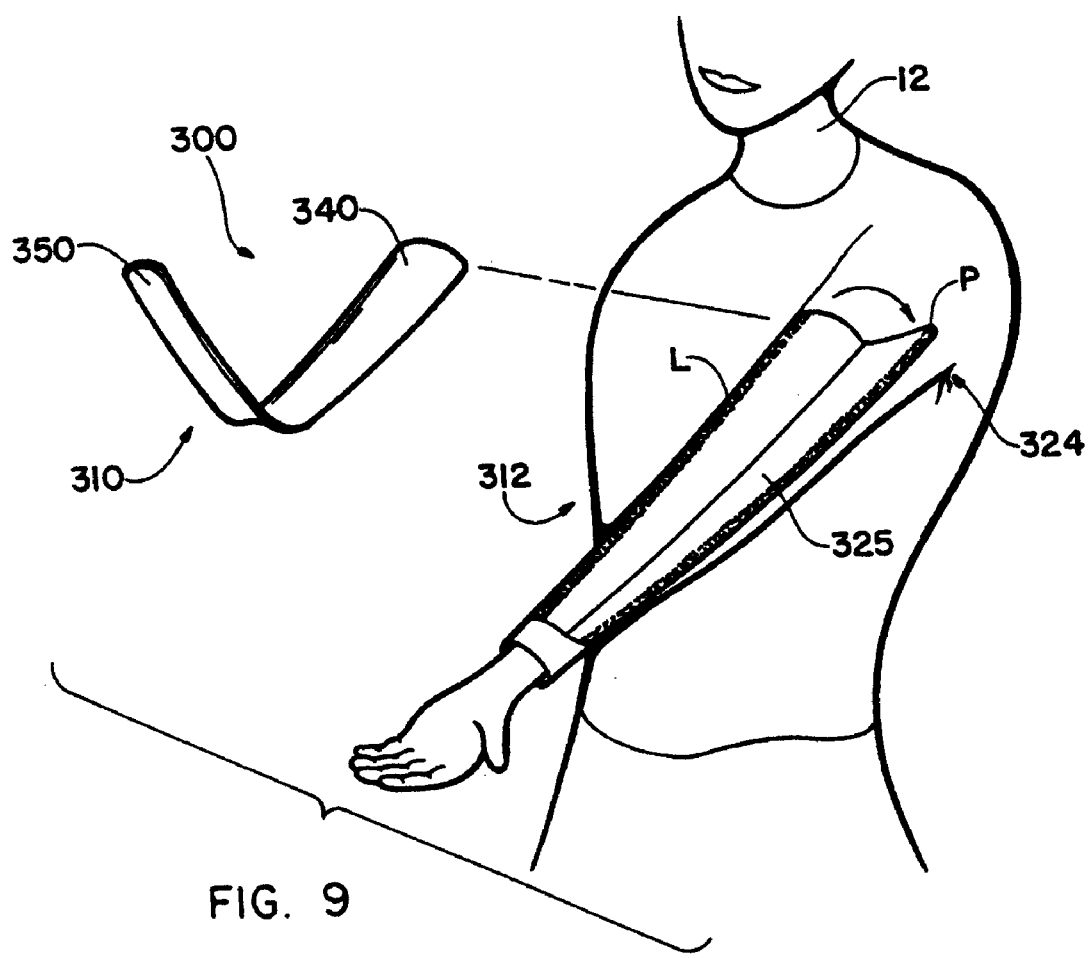
FIG. 9 is a pictorial view illustrating operative elements of yet another exercise kit, which is constructed in accordance with the present invention.

Referring now to the drawings and more particularly to FIG. 9 thereof, there is illustrated still yet another exercise kit 300 which is constructed in accordance with the present invention. The exercise kit 300 is similar to exercise kit 100 except that the exercise kit is adapted for exercising the arm muscles of the user 12.

Considering now the exercise kit 300 in greater detail with reference to FIG. 9, the exercise kit 300 generally includes a plastic member 310 and an exercise garment 312 in the form of a shirt or other type of upper body wearing apparel. The upper body wearing apparel 312 includes a pair of closeable pockets, such as the closeable pocket 324 that extends along the left arm of the user 12. A flap 325 is moveable between open and closed positions in order to secure the member 310 within the garment pocket 324.

Each of the closeable pockets, such as the closeable pocket 324 includes an elongated strip of piles P that extends along the longitudinal peripheral boundary of the pocket 324 and an elongated strip of loops L that extend along the longitudinal peripheral boundary of the flap 325. The loops L and piles P are adapted to engage lockingly together with one another in order to seal the plastic member 310 within the pocket 324.

Considering now the plastic member 310 in greater detail with reference to FIG. 9, the plastic member 310 is generally L-shaped having a smooth surface throughout its overall length. The plastic member also has a concave configuration in order to allow the member 310 to securely rest on the arm of the user within the pocket 312.

The plastic member 310 has a wider top portion 340 and a narrow bottom portion 350. In this regard, the plastic member is tapered from its upper end to its lower end in order to provide a greater resistive force against the upper arm muscles as opposed to the lower arm muscles. In this manner the kit 300 can be utilized for curling exercises of the arm muscles of the user 12.

Figure 10:
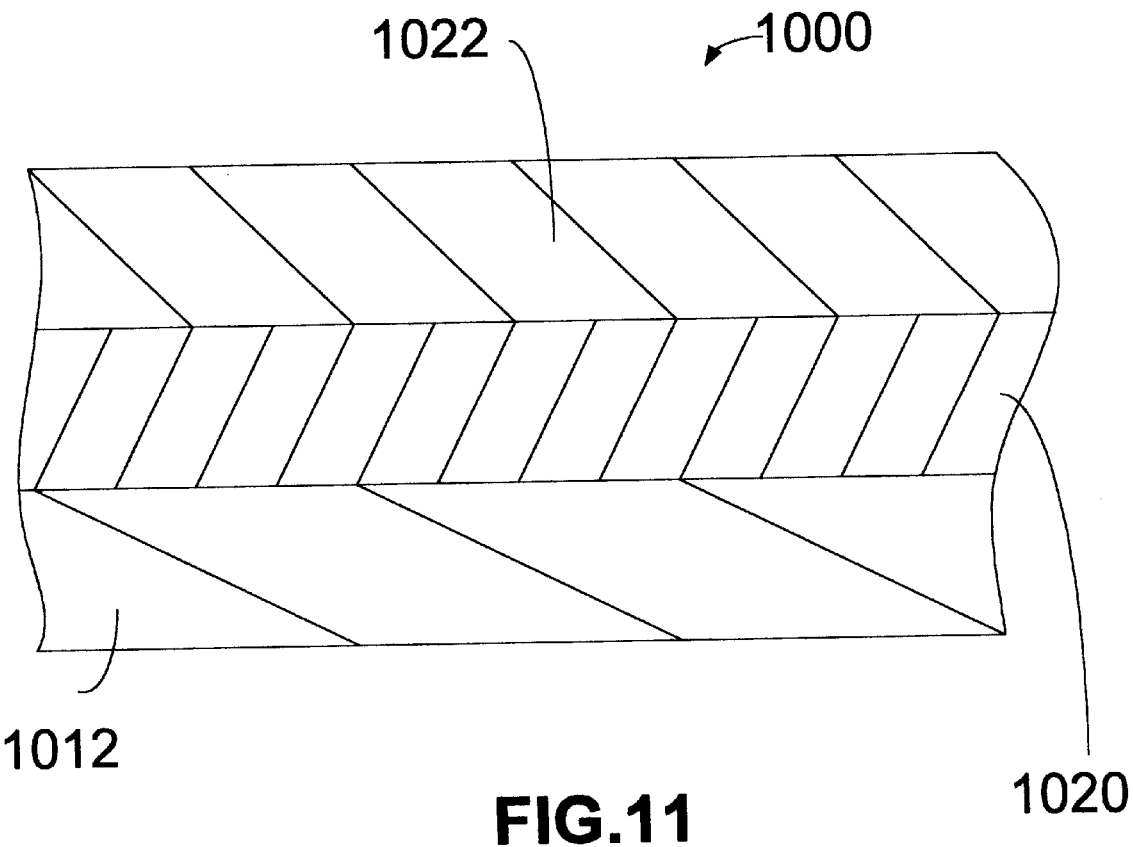
FIG. 10 is a cross-sectional view of still yet another exercise kit, which is constructed in accordance with the present invention.
Figure 11:
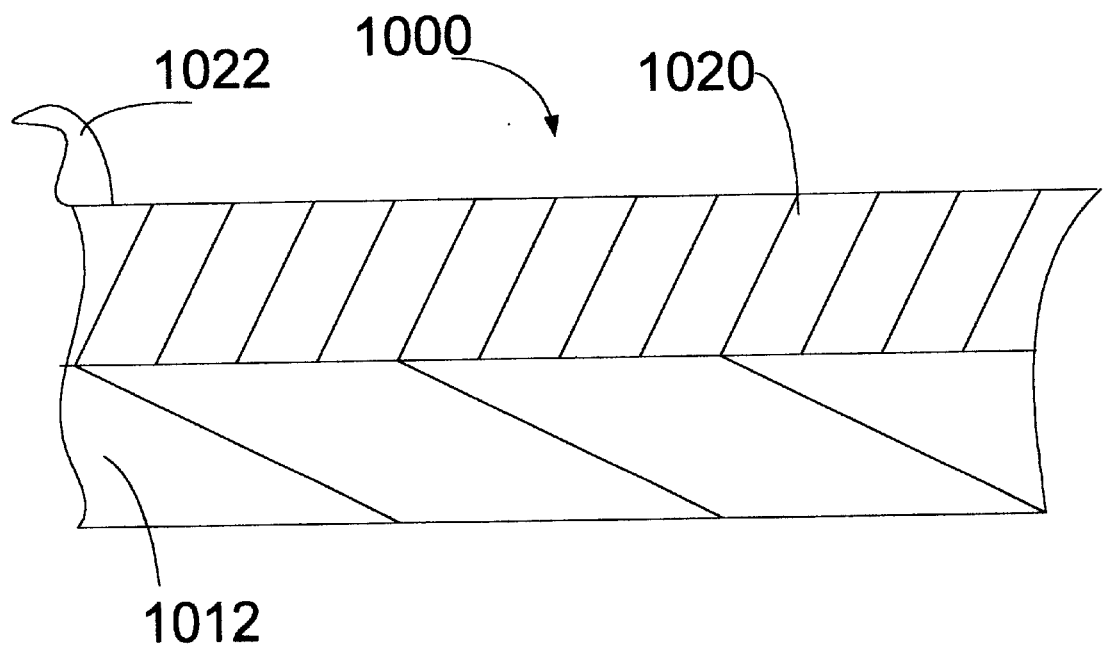
FIG. 11 is a cross-sectional view of the exercise kit of FIG. 10, illustrative a protective sheet cover partially removed from an adhesive coating.

Referring now to the drawings and more particularly to FIGS. 10 and 11 there is shown an exercise kit 1000 which is constructed in accordance with the present invention. The exercise kit 1000 is similar to the exercise kit 100 in that the kit 1000 includes a foundation article of clothing 1012 and a resilient memory member 1020. The foundation article of clothing 1012 however, does not contain a pocket for supporting the memory member 1020 in place. Instead, an thin coating of an adhesive compound 1022 is disposed on one side of the memory member 1020 allowing the memory member 1020 to be fixed to the foundation article of clothing. The adhesive compound sufficiently bonds the memory member 1020 to the foundation of the article of clothing 1012 so that the memory 1020 will not be dislodged from the article of clothing during the normal extensions and contraction of the body portion covered by the foundation article 1012.

To prevent the adhesive 1022 from contacting undesired surface areas when the memory member is not being utilized, a thin protective sheet 1024 overlays the adhesive material. This protective sheet 1024 can be easily peeled away from the adhesive material allowing the adhesive material 1022 to be exposed.

Considering now the use of the exercise kit 1000, to use the kit 1000, a user places the foundation article of clothing on his or her body covering the desired muscle groups to be exercised. Next, as best seen in FIG. 11, the user removes the protective cover 1024 from the memory member 1020 exposing the adhesive coating on the underside of the member 1020. The user then moves the memory member 1020 and the associated adhesive coating into engagement with the foundation article 1012, fixing the memory member 1020 to the foundation article 1012. The user then moves that part of the body covered by the foundation article 1012 to exercise the muscle group or groups of muscles covered by the foundation article and the memory member 1020.

Although in the preferred embodiment of the present invention, the exercise kit 1000 was described as having a single memory member, those skilled in the art will understand that two, three or more memory members of different shapes, sizes and properties can be utilized to exercise desired muscle groups of the body of the user.

It is to be understood that while certain forms of the invention have been illustrated, it is not to be limited to the specific forms or arrangements of parts herein described and shown. It will be apparent to those skilled in the art that various changes may be made without departing from the scope of the invention and the invention is not to be considered limed to what is shown in the drawings and described in the specification.

I claim:

1. An exercise kit in the form of an exercise garment, comprising:
   a foundation article of clothing of a desired shape and function to help facilitate the exercise of at least one muscle group of a user; and
   at least one resilient memory member fixed onto said foundation article to overlay said at least one muscle group of the user, said resilient memory member providing dynamic tensioning and compressing against said at least one muscle group as the muscle group moves through natural extensions and flexing actions of the user;
   wherein said memory member is a sheet of urethane having elastomeric properties.

2. An exercise garment according to claim 1, further comprising at least another resilient memory member fixed onto said foundation article for cooperating with said at least one resilient memory member to facilitate the exercising of combined muscle groups including said at least one muscle group.

3. An exercise garment according to claim 2, wherein said foundation article is panty hose.

4. An exercise garment according to claim 1, wherein said foundation article is a shirt.

5. An exercise garment according to claim 1, wherein said foundation article are pants.

6. An exercise garment according to claim 1, wherein said foundation article is a one-piece suit.

7. An exercise garment according to claim 2, wherein said foundation article is a one-piece suit.

8. An exercise garment according to claim 7, wherein said at least one memory member and said at least another memory member are spaced apart from one another.

9. An exercise garment according to claim 8, wherein said at least one memory member and said at least another memory member are substantially straight elongated members to help facilitate exercising different muscle groups of the body in combination.

10. An exercise garment according to claim 8, wherein said at least one memory member and said at least another memory member are substantially bent along their longitudinal axes to help facilitate exercising different muscle groups of the body in combination.

11. An exercise garment according to claim 1, wherein said foundation article is a brace for supporting the muscles associated with an extremity joint of the user.

12. An exercise garment according to claim 2, wherein said at least another memory member is a single strand.

13. An exercise garment according to claim 2, wherein said at least another memory member is formed from a plurality of strands in a side by side relationship.

14. An exercise garment according to claim 3, wherein said at least another memory member is, in the form of a seam extending along each longitudinal axis of said panty hose.

15. A method of using a muscle toning kit for toning different muscle groups of the body of a user, comprising:
 placing on the body of the user a light weight garment having at least a pair of elongated pockets each with a pocket closure member at a proximate end thereof;
 inserting in one of the pockets an elongated plastic member, said plastic member being resilient and providing resistance when deformed and not providing resistance when restored to an original shape;
 closing the last mentioned pocket with its associated pocket closure member to secure said elongated plastic member within the pocket; and
 performing physical activities including movement of at least some portion of the body sufficient to cause said plastic member to deform and to provide sufficient resistance to the movement to tone the muscles of the user experiencing such resistance.

16. A method of using a must toning kit for toning different muscle groups of the body of a user according to claim 15 further comprising:
 inserting in the other one of the pockets another elongated plastic member, said another plastic member being resilient and providing resistance when deformed and not providing resistance when restored to an original shape;
 closing the last mentioned pocket with its associated pocket closure member to secure said another elongated plastic member within the pocket; and
 performing physical activities including movement of at least some portion of the body sufficient to cause said another plastic member to deform and to provide sufficient resistance to the movement to tone the muscles of the user experiencing such resistance.

17. The method of claim 15, further comprising:
 wearing said lightweight garment while performing said physical activities continuously for an extended period of time.

18. The method of claim 17, wherein said extended period of time is between one minute and twelve hours.

19. The method of claim 15 wherein the light weight garment is worn as part of a weight loss program and further comprising:
 changing the plastic member for another plastic member having a greater resistance, said greater resistance being sufficiently great to help facilitate weight loss when deformed continuously repeatedly for an extended period of time.

20. The method of claim 15 wherein the lightweight garment is worn as underwear placed directly against and in contact with the skin of the user without any intervening under garment.

21. The method of claim 20 wherein said plastic member is located longitudinally on a limb portion of the garment.

22. The method of claim 21 wherein said plastic member is located on a buttock and a leg portion of the garment.

23. The method of claim 21, wherein said plastic member is located on an arm portion of the garment.

24. The process of claim 15 wherein said plastic member is located longitudinally on a leg portion of the garment.

25. An exercise kit in the form of an exercise garment, comprising:
 a foundation article of clothing of a desired shape and function to help facilitate the exercise of at least one muscle group of a user; and
 at least one resilient memory member fixed onto said foundation article to overlay said at least one muscle group of the user, said resilient memory member providing dynamic tensioning and compressing against said at least one muscle group as the muscle group moves through natural extensions and flexing actions of the user;
 wherein said memory member is fixed by an adhesive coating disposed on an underside portion of said memory member.

26. An exercise kit according to claim 25, wherein said adhesive coating is covered by a protective sheet, said protective sheet being easily removed from said adhesive to expose the adhesive coating to facilitate fixing the memory member to the foundation article of clothing.

27. An exercise kit in the form of an exercise garment, comprising:
 a foundation article of clothing of a desired shape and function to help facilitate the exercise of at least one muscle group of a user; and
 at least one resilient memory member fixed onto said foundation article to overlay said at least one muscle group of the user, said resilient memory member providing dynamic tensioning and compressing against said at least one muscle group as the muscle group moves through natural extensions and flexing actions of the user;
 wherein said memory member is a cast urethane member having elastomeric properties.

28. An exercise kit according to claim 1, wherein said sheet of urethane is interwoven with said foundation article of clothing; and
 wherein said foundation article of clothing is made of a stretchable material.

* * * * *